Sept. 30, 1952 J. M. MOCHEL Re. 23,555

ELECTRICALLY CONDUCTING COATING ON GLASS AND OTHER CERAMIC BODIES

Original Filed Sept. 3, 1947

Inventor
JOHN M. MOCHEL
By F. H. Knight
Attorney

Reissued Sept. 30, 1952

Re. 23,555

UNITED STATES PATENT OFFICE 23,555

ELECTRICALLY CONDUCTING COATING ON GLASS AND OTHER CERAMIC BODIES

John M. Mochel, Louisville, Ky., assignor to Corning Glass Works, Corning, N. Y., a corporation of New York Original No. 2,564,987, dated August 21, 1951, Serial No. 771,860, September 3, 1947. Application for reissue May 15, 1952, Serial No. 288,009

1 Claim. (Cl. 201—73)

Matter enclosed in heavy brackets [ ] appears in the original patent but forms no part of this reissue specification; matter printed in italics indicates the additions made by reissue.

This invention relates to glass articles and other ceramic bodies having electrically conducting oxide coatings of the kind known generally as iridized coatings. When glass or other vitreous ceramic body is heated and contacted with certain metal salts, either in the form of fumes or atomized solutions thereof, a strongly adherent layer of an oxide of the metal is formed on its surface. This process is known as iridizing because the coatings thus produced are frequently iridescent due to interference of light waves reflected from the extremely thin oxide films.

The application of iridizing to glass for the production of beautiful art ware is quite old and for this purpose salts of tin and of iron are employed. More recently it has been found that tin iridized coatings have a sufficiently low electrical resistivity at normal temperature to permit their use on high-tension electric insulators for the purpose of [decreasing] *spreading* the potential gradient on the surfaces of the insulators and thus preventing corona and radio interference. United States Patent 2,118,795, issued May 2, 1938, to Jesse T. Littleton, discloses the use of tin iridized coatings on electric insulators for such a purpose. For some purposes the tin iridized coatings are not suitable.

One of the chief objects of this invention is to produce on glass and other non-porous ceramic surfaces electrically conducting coatings which are permanently incorporated with the glass or ceramic surface, and which have sufficiently low electrical resistivities to permit the use of such articles for electric heating devices.

Another object is to provide transparent electric resistance elements for use in electric heating devices such as ovens, broilers, toasters, flat irons, grills, space heaters, and the like.

Another object is to provide glass bodies having iridized coatings of predetermined electrical resistance.

Another object is to provide a conducting iridized coating which consists of an oxide of indium.

Another object is to provide a conducting iridized film which consists of an oxide of indium.

In another application Serial Number [771,861,] *771,859, filed September 3, 1947,* now [abandoned, filed by me concurrently herewith,] *Patent No. 2,564,707, issued August 21, 1951,* I have described [and claimed] iridized films comprising an oxide of indium and an oxide of tin. *An electric resistance device embodying such a film as an element is claimed in my application Serial Number 197,515, filed November 24, 1950, now Patent No. 2,564,709, issued August 21, 1951.*

The present invention is directed to similar films composed of an oxide of indium alone, and to ceramic surfaces coated therewith to be hereinafter more fully described and illustrated in the accompanying drawing in which.

Figure 1:
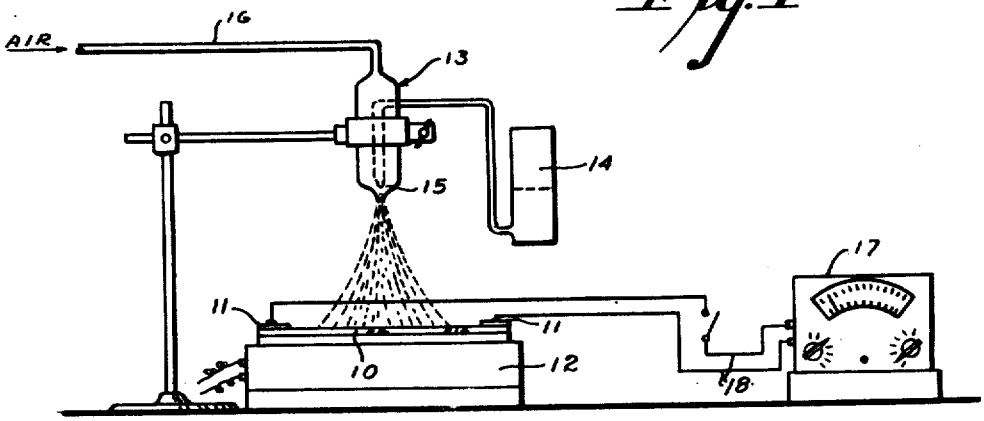
Fig. 1 is an elevation of an apparatus for iridizing glass sheets in accordance with the invention.

I have discovered that films composed of indium oxide and produced by iridization with a salt of indium, have relatively low electrical resistivities and can be used for various purposes.

The electrical properties of the new oxide films are influenced by various factors including thickness of the films, the temperature at which the films are produced and the relative expansion coefficients of the films and the glass or ceramic body upon which they are deposited, as will hereinafter be more fully explained.

The thickness of the iridized film may be gauged by the apparent color of the film caused by interference of light reflected therefrom. As the thickness of the film increases, its apparent color changes and the order of succession of the colors with increasing thickness is analogous to that of the well-known Newton rings described in "A Treatise on Light," by R. A. Houstoun, Longmans, Green & Co., Ltd. (1938), page 147, as follows:

1st order—white, yellow, red,
2nd order—violet, blue, green, yellow, red,
3rd order—purple, blue, green, yellow, red,
4th order—green, red,
5th order—greenish-blue, red,
6th order—greenish-blue, pale red,
7th order—greenish-blue, reddish-white.

Obviously, a film of uniform thickness will appear to be of one color only. A slight non-uniformity in film thickness at the edge of the plate will produce sufficient color sequence to identify the order of thickness of the main portion of the film. As a further aid, a long strip of glass may be iridized by directing the spray at one end thereof whereby the various orders of colors will be spread longitudinally of the strip and will serve as a convenient comparison. Since red marks the ends of each order, this color is preferably employed as the distinguishing mark of the successive orders. For present purposes, red light has a wave length of 6200 Angstroms. Calculation shows that the approximate film thickness in Angstroms for the various orders of red is as follows:

| Order | Angstroms |
|---|---|
| 1 | 775 |
| 2 | 2,380 |
| 3 | 3,870 |
| 4 | 5,420 |
| 5 | 6,970 |

The common unit of electrical resistivity of any material is the "ohm cm." which is the resistance in ohms between two opposite faces of a cube of the material, each dimension of which is 1 cm. For a square film of material the electrical resistivity therefore becomes the resistance in ohms multiplied by the thickness of the film in centimeters. For convenience the resistance in ohms of a square film of third order red is herein employed as the unit of specific resistance and in order to avoid confusion it is designated "standard resistance." The resistivity may be calculated by multiplying the "standard resistance" by the thickness in centimeters of a third order red film ($3870 \times 10^{-8}$ cm.).

The iridized films of this invention may be formed advantageously upon the surface of a glass article, such as a glass sheet. They are preferably produced by heating the glass uniformly to an elevated temperature which may be about 500° C. or above, and atomizing a solution containing indium chloride as a fine mist upon the heated glass for a length of time sufficient to produce an iridized film of the desired thickness and electrical resistance.

The atomized solution is preferably directed perpendicularly against the surface to be coated for a time, usually 10 to 20 seconds, which will depend upon the rate of atomization, concentration of the solution, the desired thickness of the film, etc. To some extent the thickness will govern the electrical resistance of the film, the resistance becoming generally lower as the thickness is increased. The electrical resistance may be measured with an ohmmeter during iridizing. For this purpose and for subsequent use in the application of electric current to the film, permanent electrical contacts therewith may be provided on the glass plate before iridizing takes place. This may be accomplished by metallizing two opposite edges of the glass plate, as by the application thereto of a platinizing solution which is fired on in the usual manner to provide adherent bands or stripes of metallic platinum on the glass.

In the drawing, Fig. 1 illustrates one form of apparatus for carrying out the above-described process. A glass plate 10, provided with platinized stripes 11 (shown on an exaggerated scale) on two opposite edges, is about three inches square between the stripes 11. It is heated uniformly on an electric hot plate 12. An atomizer, generally designated 13 and preferably composed of glass, comprises a cup 14 for containing the solution to be atomized, an atomizing nozzle 15 and a tube 16 for the introduction of compressed air to the nozzle. The atomizer is supported above the glass plate 10 so that the nozzle 15 is about one foot above the glass plate. An ohmmeter 17 is provided with two contact leads 18 which may be brought into electrical contact with stripes 11 (as shown) before atomization. As atomization proceeds and a conducting iridized film is formed on the glass, the electrical resistance which is registered by the ohmmeter decreases from an initial infinite value as the thickness of the film increases. When the electrical resistance attains the desired value, atomization is stopped by cutting off the supply of compressed air from the atomizer 13.

The following example will illustrate but does not limit the invention: 5.3 g. of pure indium chloride ($InCl_3$) were dissolved in 8 cc. of water and 2 cc. of concentrated aqueous hydrochloric acid and the solution was atomized for ten seconds on a plate of heat-resisting borosilicate glass which was heated at 700° C. The resulting film of indium oxide was transparent and had a "standard resistance" of 675 ohms [per square]. When the iridized plate was heated at 250° C. for 2 hours, the "standard resistance" at room temperature was lowered to 465 ohms [per square]. The resistance of the film may also be lowered by increasing the time of iridization which increases the thickness of the film.

In lieu of indium chloride, other salts of indium may be used whereby results similar to those set forth above may be obtained.

Figure 2:
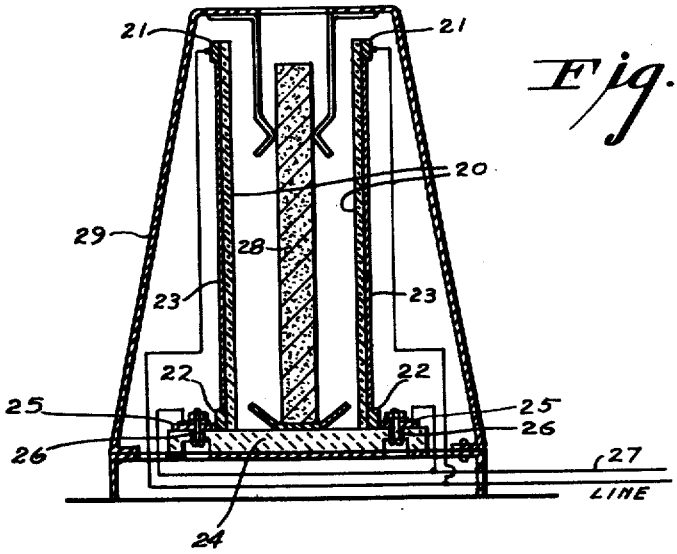
Fig. 2 is a vertical sectional view of an electrically heated device for toasting bread made in accordance with the invention.

To illustrate electric heating devices made in accordance with this invention, reference is had to Fig. 2 in which two glass plates 20 are provided on opposite edges with platinized stripes 21 and 22 (shown on an exaggerated scale), and iridized films 23 (also greatly exaggerated). The plates 20 are supported in spaced parallel relation on a dielectric base 24 by metal strips 25 which are attached to the platinized stripes 22. The metal strips 25 are secured to the base 24 by binding posts 26 to which a wire 27 forming one side of an electric circuit is connected. The other side of the circuit is electrically connected with the platinized stripes 21. From this it will be seen that the iridized films 23 are electrically connected in parallel. Between the glass plates 20 is located a slice of bread 28 to be toasted and the entire assembly is surrounded by a protecting shell 29.

Other arrangements of the various parts of the device shown in Fig. 2 and modifications thereof for other purposes will be apparent to those skilled in the art and are included within the scope of the invention as claimed.

I claim:

An electric resistance device comprising a nonporous, vitreous, ceramic body having on a surface thereof an electrically conducting, iridized metal-oxide film integrally united with the surface and consisting essentially of indium oxide, said body being provided with spaced terminals in electrical contact with such film.

JOHN M. MOCHEL.

REFERENCES CITED

The following references are of record in the file of this patent or the original patent:

UNITED STATES PATENTS

| Number | Name | Date |
|---|---|---|
| 2,026,086 | Farncomb | Dec. 31, 1935 |
| 2,118,795 | Littleton | May 24, 1938 |
| 2,194,189 | Wheeler et al. | Mar. 19, 1940 |
| 2,429,420 | McMaster | Oct. 21, 1947 |
| 2,516,663 | Zunich | July 25, 1950 |

OTHER REFERENCES

Versatile Indium, Rose, Scientific American, April 1944, pp. 154–156, 75—In. D.

Thiel et al.: Chem. Abstracts (Sept.-Dec. 1910), vol. 4, pp. 2613–2614.

Disclaimer

Re. 23,555.—*John M. Mochel*, Louisville, Ky. ELECTRICALLY CONDUCTING COATING ON GLASS AND OTHER CERAMIC BODIES. Patent dated Sept. 30, 1952. Disclaimer filed Feb. 16, 1954, by the assignee, *Corning Glass Works*.

Hereby enters this disclaimer to the single claim of said reissued Letters Patent.

[*Official Gazette March 16, 1954.*]